United States Patent
Peng

(10) Patent No.: US 10,969,856 B2
(45) Date of Patent: Apr. 6, 2021

(54) WIRELESS COMMUNICATION CIRCUIT AND METHOD FOR CONTROLLING WIRELESS COMMUNICATION CIRCUIT

(71) Applicant: Realtek Semiconductor Corp., HsinChu (TW)

(72) Inventor: Zuohui Peng, Suzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/667,935

(22) Filed: Oct. 30, 2019

(65) Prior Publication Data

US 2020/0241623 A1 Jul. 30, 2020

(30) Foreign Application Priority Data

Jan. 30, 2019 (CN) .......................... 201910089182.7

(51) Int. Cl.
| | |
|---|---|
| G06F 1/32 | (2019.01) |
| H04W 52/02 | (2009.01) |
| G06F 1/3234 | (2019.01) |
| G06F 1/3293 | (2019.01) |
| G06F 1/3287 | (2019.01) |
| H04W 76/10 | (2018.01) |

(52) U.S. Cl.
CPC .......... *G06F 1/3243* (2013.01); *G06F 1/3287* (2013.01); *G06F 1/3293* (2013.01); *H04W 52/0261* (2013.01)

(58) Field of Classification Search
CPC .... G06F 1/3243; G06F 1/3293; G06F 1/3287; G06F 1/3278; G06F 1/3275; H04W 52/0261; H04W 52/0209; H04W 76/10; H04W 52/0225; H04W 52/0229

USPC ................................................. 713/300, 320
See application file for complete search history.

(56) References Cited

U.S. PATENT DOCUMENTS

| | | | | |
|---|---|---|---|---|
| 2014/0089513 A1* | 3/2014 | Adachi | ................. | H04W 76/10 709/227 |
| 2014/0181558 A1* | 6/2014 | Taha | ................... | G06F 12/0238 713/323 |
| 2018/0242246 A1* | 8/2018 | Ryu | ................. | H04W 52/0225 |

FOREIGN PATENT DOCUMENTS

| | | |
|---|---|---|
| CN | 104885034 A | 9/2015 |
| CN | 105144789 A | 12/2015 |
| CN | 105472703 A | 4/2016 |
| CN | 105979095 A | 9/2016 |
| TW | I474734 | 2/2015 |

(Continued)

*Primary Examiner* — Michael J Brown
(74) *Attorney, Agent, or Firm* — Winston Hsu

(57) ABSTRACT

A method for controlling a wireless communication circuit is provided, wherein the wireless communication circuit is positioned in a first electronic device, and the method includes the steps of: obtaining parameters of each of a plurality of channels of the wireless communication circuit, and storing the parameters of each channel into a first storage device of the wireless communication circuit, wherein the plurality of channels are capable of being used for communications between the first electronic device and a second electronic device; using at least one specific channel of the plurality of channels to communicate with the second electronic device; and when the wireless communication circuit enters a power saving mode, retaining the parameters of the at least one specific channel, and removing at least a portion of the parameters of the other channels from the first storage device.

12 Claims, 3 Drawing Sheets

(56) References Cited

FOREIGN PATENT DOCUMENTS

TW    I556662    11/2016
TW    I596908     8/2017

* cited by examiner

US 10,969,856 B2

WIRELESS COMMUNICATION CIRCUIT AND METHOD FOR CONTROLLING WIRELESS COMMUNICATION CIRCUIT

BACKGROUND OF THE INVENTION

1. Field of the Invention

The present invention relates to a wireless communication circuit, and more particularly, to a method for lowering power consumption of the wireless communication circuit.

2. Description of the Prior Art

In order to lower overall power consumption in Wi-Fi communications, the related circuits are disabled in an idle state. In the idle state, however, the circuits still need to communicate with another electronic device (e.g. the access point) periodically, to receive beacon packets. Therefore, the circuits generally store parameters of all of the channels in an internal memory. Hence, the internal memory needs large power consumption even if the Wi-Fi circuits are in the idle state, and the power saving effect cannot be improved.

SUMMARY OF THE INVENTION

It is therefore an objective of the present invention to provide a wireless communication circuit and a method for controlling a wireless communication circuit, which can lower the power consumption of the memory when the wireless communication circuit is in the idle state, to solve the above-mentioned problems.

According to one embodiment of the present invention, a method for controlling a wireless communication circuit is provided, wherein the wireless communication circuit is positioned in a first electronic device, and the method comprises the steps of: obtaining parameters of each of a plurality of channels of the wireless communication circuit, and storing the parameters of each channel into a first storage device of the wireless communication circuit, wherein the plurality of channels are capable of being used for communications between the first electronic device and a second electronic device; using at least one specific channel of the plurality of channels to communicate with the second electronic device; and when the wireless communication circuit enters a power saving mode, retaining the parameters of the at least one specific channel, and removing at least a portion of the parameters of the other channels from the first storage device.

In another embodiment of the present invention, a wireless communication circuit positioned in a first electronic device is disclosed, wherein the wireless communication circuit comprises a control circuit and a first storage device. In the operations of the wireless communication circuit, the control circuit obtains parameters of a plurality of channels, and stores the parameters of each channel into the first storage device, wherein the plurality of channels are capable of being used for communications between the first electronic device and a second electronic device, and the control circuit controls the wireless communication circuit to communicate with the second electronic device by using at least one specific channel of the plurality of channels. When the wireless communication circuit enters a power saving mode, the control circuit controls the first storage device to retain the parameters of the at least one specific channel, and to remove at least a portion of the parameters of the other channels from the first storage device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
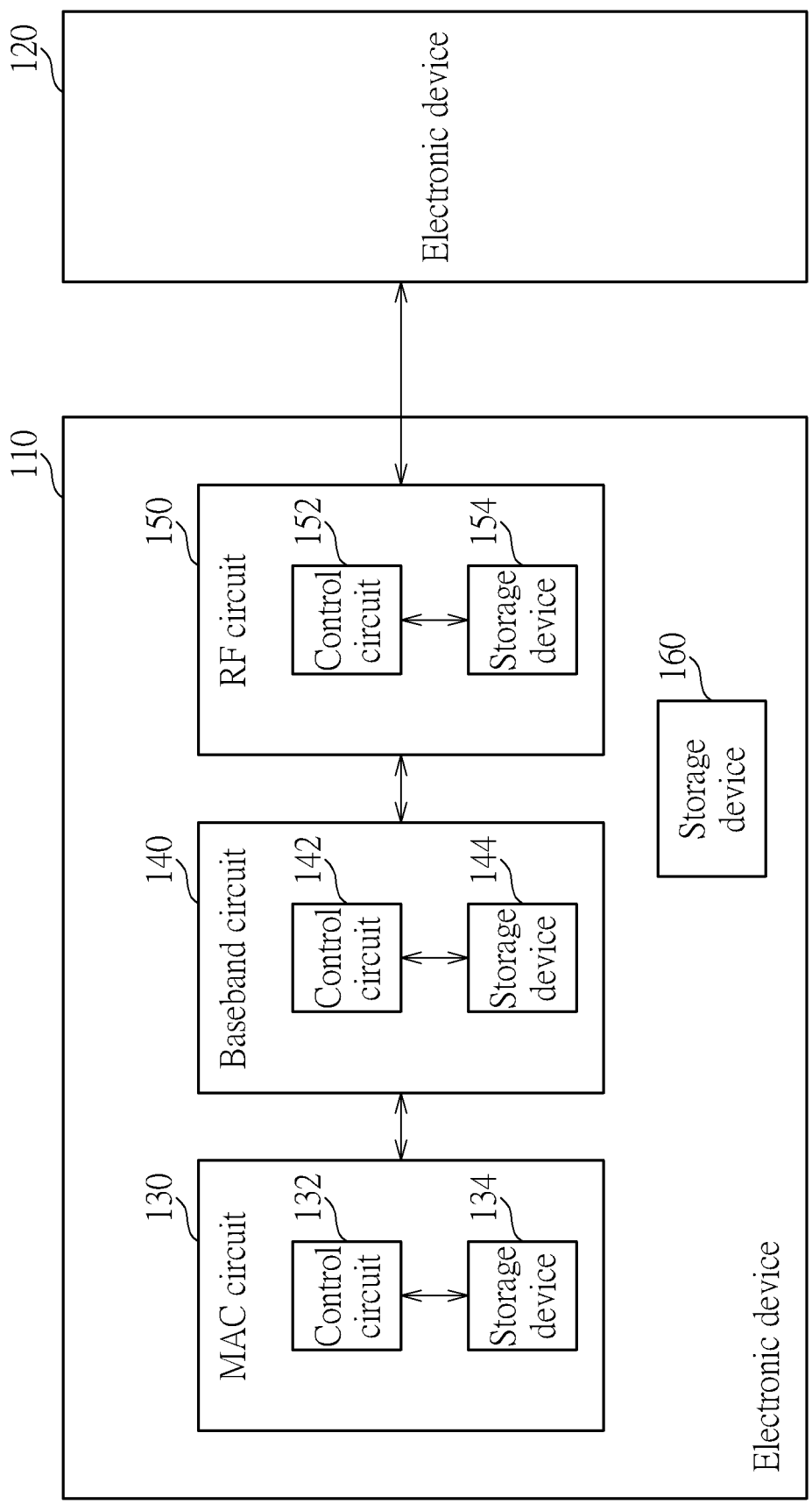
FIG. 1 is a diagram illustrating a wireless communication system according to one embodiment of the present invention.

FIG. 1 is a diagram illustrating a wireless communication system according to one embodiment of the present invention. As shown in FIG. 1, the wireless communication system comprises two electronic devices 110 and 120, wherein the electronic device 110 includes a plurality of wireless communication circuits (e.g., a media access control (MAC) circuit 130, a baseband circuit 140 and a radio-frequency (RF) circuit 150) and a storage device 160. The MAC circuit 130 includes a control circuit 132 and a storage device 134, the baseband circuit 140 includes a control circuit 142 and a storage device 144, and the RF circuit 150 includes a control circuit 152 and a storage device 154. In this embodiment, the electronic device 110 may be a smart phone, tablet, a notebook or any other electronic device having wireless communication function. In addition, the electronic device 120 serves as an access point.

In this embodiment, the MAC circuit 130, the baseband circuit 140 and the RF circuit 150 may be independent chips, and each of the MAC circuit 130, the baseband circuit 140 and the RF circuit 150 can operate in a normal mode or a power saving mode (or sleep mode) based on the current statuses. When the MAC circuit 130, the baseband circuit 140 and the RF circuit 150 operate in the power saving mode, a portion of the elements within the control circuits 132, 142 and 152 are powered down, and the storage devices 134, 144 and 155 will delete a portion of data and a portion of the storage devices 134, 144 and 155 is powered down, to lower the power consumption. In one embodiment, when the MAC circuit 130 operates in the power saving mode, the storage device 134 retains the data such as basic service set identifier (BSSID), security key, MAC identity, Wi-Fi setting parameters, firmware and related parameters, and required timer. The storage devices 144 and 154 can retain the data such as RF parameters and gain tables of some channel components (e.g. power amplifier).

In one embodiment, the storage devices 134, 144 and 154 include volatile memories such as static random access memory (SRAM), flip-flops, or other types of buffers; and the storage device 160 includes non-volatile memory such as flash memory.

As described in the prior art, when the circuits enters the power saving mode, all of the parameters of all the channels are still stored in the storage device, so the regions of the storage devices 144 and 154 capable of being powered down are limited, and the power consumption of the storage devices 144 and 154 cannot be further improved. Therefore, in this embodiment, when the baseband circuit 140 or the RF circuit 150 enters the power saving mode, the parameters that are not used temporarily can be removed from the storage devices 144 and 154, and the storage devices 144 and 154 will have more regions capable of being powered down to greatly reduce the power consumption.

Figure 2:
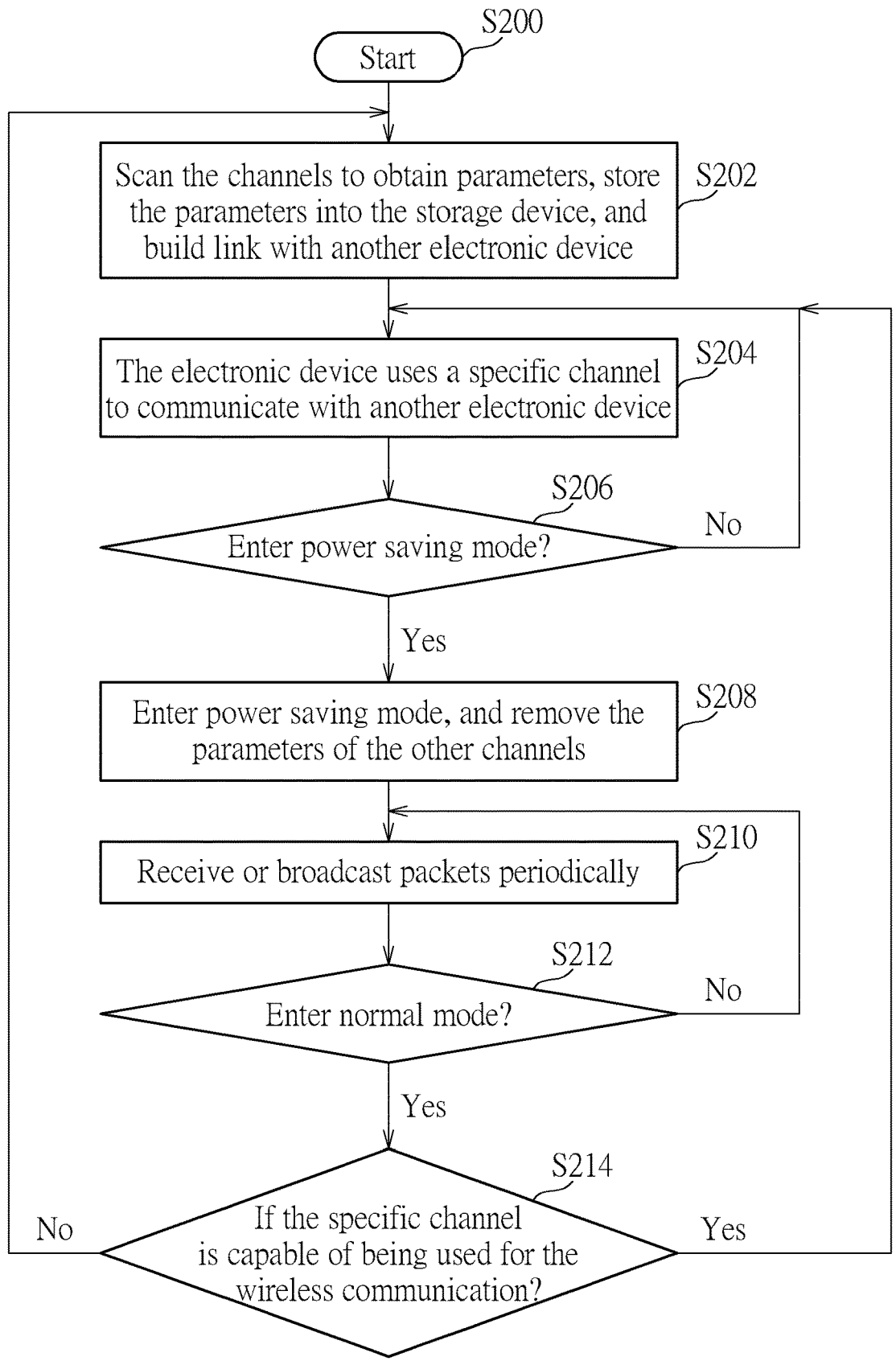
FIG. 2 is a flowchart of a method for controlling a wireless communication circuit according to one embodiment of the present invention.

FIG. 2 is a flowchart of a method for controlling a wireless communication circuit according to one embodiment of the present invention. For convenience of the following description, the RF circuit 150 serves as an example of the wireless communication circuit, but the present invention is not limited thereto. In Step S200, the flow starts. In Step S202, the electronic device 110 scans and calibrates all of the channels to obtain a plurality of parameters. In one embodiment, the control circuit 152 of the RF circuit 150 scans and calibrates fourteen Wi-Fi channels to obtain the parameters of each channel, and these parameters are stored in the storage device 154, and the electronic devices 110 and 120 start to build link with each other. For example, the parameters of each channel may include transmission power, output/input frequency, setting parameters of the receivers and the low-noise amplifiers, setting parameters of the filters and etc.

In Step S204, the electronic devices 110 and 120 select a specific channel such as Wi-Fi channel six for the wireless communications and data communications. In Step S206, the RF circuit 150 determines if entering the power saving mode from the normal mode, and if the RF circuit 150 enters the power saving mode, the flow enters Step S208; and if not, the flow goes back to Step S204. In one embodiment, the control circuit 152 of the RF circuit 150 can determine if entering the power saving mode according to the throughput of the received data. For example, the control circuit 152 may enter the power saving mode if the control circuit 152 detects that the packet from the electronic device 120 has not been received for a period of time.

In Step S208, the RF circuit 150 enters the power saving mode, and the control circuit 152 will retain the parameters of the specific channel, and delete the parameters of all the other channels within the storage device 154, and part of the parameters can be permanently deleted or moved to storage device 160. For example, if the storage device 154 stores the parameters of fourteen Wi-Fi channels, and the electronic device 110 uses the Wi-Fi channel six to communicate with the electronic device 120 before the power saving mode, at this time the control circuit 152 can remove the parameters of the Wi-Fi channel 1-5 and 7-14 from the storage device 154, that is only the parameters of the Wi-Fi channel six are retained in the storage device 154. In addition, in the power saving mode, some functions of the control circuit 152 are disabled, and some regions of the storage device 154 are powered down. Hence, because most of the parameters are removed from the storage device 154, the regions capable of being powered down can be greatly increased, and the power consumption of the RF circuit 150 is effectively decreased.

In Step S210, when the RF circuit 150 operates in the power saving mode, the RF circuit 150 still receives beacon packets from the electronic device 120 periodically, or broadcasts some packets (e.g. null packet), to maintain the communications.

In Step S212, the RF circuit 150 determines if entering the normal mode from the power saving mode, and if the RF circuit 150 enters the normal mode, the flow enters Step S214; and if not, the flow goes back to the Step S210. For example, the RF circuit 150 can determine if entering the normal mode according to a message from the electronic device 120 or a user's control.

In Step S214, the RF circuit 150 tries to directly use the parameters of the specific channel stored in the storage device 154 to communicate with the electronic device 120. If the electronic device 110 can use parameters of the specific channel stored in the storage device 154 to communicate with the electronic device 120, the flow enters Step S204; and if the electronic device 110 cannot use the parameters of the specific channel stored in the storage device 154 to communicate with the electronic device 120, the flow enters Step S202 to scan all of the channels.

In one embodiment, after the flow goes to the Step S202 from the Step S214, the electronic device 110 can select another specific channel to build link with the electronic device 120. In addition, the electronic device 110 can communicate with other electronic device(s) via the other specific channel.

Figure 3:
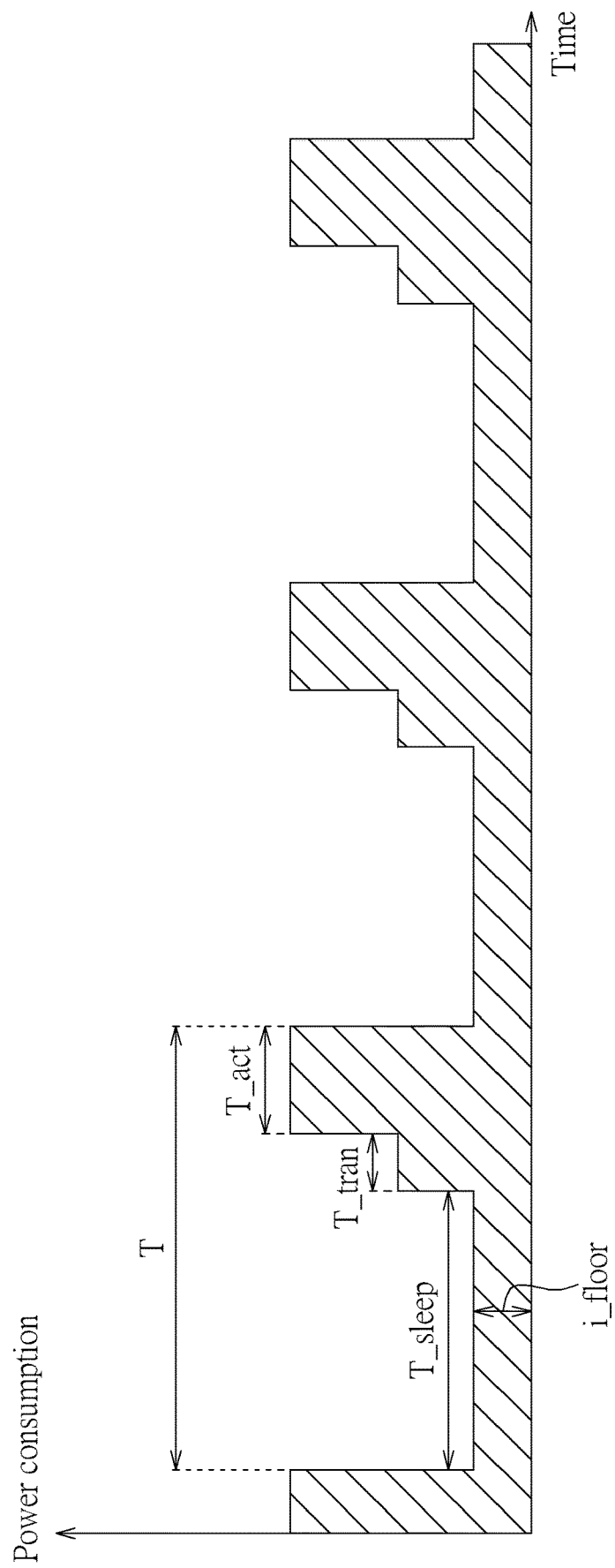
FIG. 3 shows power consumption of the RF circuit in a power saving mode.

FIG. 3 shows the power consumption of the RF circuit 150 in the power saving mode. As shown in FIG. 3, during a first period T, the RF circuit 150 is in a sleep state during the period T_sleep, and most of the components within the control circuit 152 are in the sleep mode, and the overall current consumption is i_floor. In the period T_tran, the RF circuit 150 is in the transition state and prepares to receive the beacon packets from the electronic device 120, and some components of the control circuit 152 are powered on and enabled. In the period T_act, the control circuit 152 starts to receive the beacon packets or broadcast the packets, at this time the RF circuit 150 has the largest power consumption within the period T. In this embodiment, referring to the Step S208 shown in FIG. 2, because most of the parameters are removed from the storage device 154 in the power saving mode, by increasing the regions of the storage device 154 capable of being powered down, the current consumption i_floor may have a lower value to greatly improve the power consumption in the power saving mode.

It is noted that although the above descriptions use the RF circuit 150 as an example, a person skilled in the art should understand that the above power saving mechanism can also be applied to the baseband circuit 140 or other wireless communication chip(s) storing channel parameters.

It is noted that in the above embodiments, the RF circuit 150 retains the parameters of only one specific channel when entering the power saving mode, but it is not a limitation of the present invention. In other embodiments of the present invention, the RF circuit 150 can retain the parameters of two or more specific channels when entering the power saving mode. As long as a portion of the parameters of some channels are removed from the storage device 154 when the RF circuit 150 enters the power saving mode, these alternative designs shall fall within the scope of the present invention.

Briefly summarized, in the wireless communication circuit and method for controlling the wireless communication circuit, by only retaining a portion of channel parameters in the power saving mode, the power consumption of the storage device of the wireless communication circuit in the idle state can be greatly reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling a wireless communication circuit, wherein the wireless communication circuit is positioned in a first electronic device, and the method comprises:

obtaining parameters of each of a plurality of channels of the wireless communication circuit, and storing the parameters of each channel into a first storage device of the wireless communication circuit, wherein the plurality of channels are capable of being used for communications between the first electronic device and a second electronic device;

using at least one specific channel of the plurality of channels to communicate with the second electronic device; and when the wireless communication circuit enters a power saving mode, retaining the parameters of the at least one specific channel, and removing at least a portion of the parameters of the other channels from the first storage device; and when the wireless communication circuit re-enters a normal mode from the power saving mode and the wireless communication circuit does not communicate with the second electronic device by using the parameters of the at least one specific channel successfully, calibrating the plurality of channels to obtain the parameters of each channel, and using one of the plurality of channels to communicate with the second electronic device or a third electronic device.

2. The method of claim 1, wherein the first electronic device only uses one specific channel to communicate with the second electronic device, and the step of when the wireless communication circuit enters the power saving mode, retaining the parameters of the at least one specific channel, and removing at least a portion of the parameters of the other channels from the first storage device comprises:

when the wireless communication circuit enters the power saving mode, only retaining the parameters of the specific channel, and the removing the parameters of the other channels from the first storage device.

3. The method of claim 1, further comprising:

when the wireless communication circuit enters the normal mode from the power saving mode, the wireless communication circuit directly uses the parameters of the at least one specific channel to communicate with the second electronic device.

4. The method of claim 1, wherein the step of when the wireless communication circuit enters the power saving mode, retaining the parameters of the at least one specific channel, and removing at least a portion of the parameters of the other channels from the first storage device comprises:

moving at least a portion of the parameters of the other channels into a second storage device.

5. The method of claim 4, wherein the first storage device is a volatile memory, and the second storage device is a non-volatile memory.

6. The method of claim 1, wherein the plurality of channels are W-Fi channels, and the parameters of each channel are RF parameters.

7. A wireless communication circuit positioned in a first electronic device, comprising:

a control circuit; and a first storage device;

wherein the control circuit obtains parameters of a plurality of channels, and stores the parameters of each channel into the first storage device, wherein the plurality of channels are capable of being used for communications between the first electronic device and a second electronic device, and the control circuit controls the wireless communication circuit to communicate with the second electronic device by using at least one specific channel of the plurality of channels; and when the wireless communication circuit enters a power saving mode, the control circuit controls the first storage device to retain the parameters of the at least one specific channel, and to remove at least a portion of the parameters of the other channels from the first storage device; and wherein when the wireless communication circuit re-enters a normal mode from the power saving mode and the wireless communication circuit does not communicate with the second electronic device by using the parameters of the at least one specific channel successfully, the control circuit calibrate the plurality of channels to obtain the parameters of each channel, and uses one of the plurality of channels to communicate with the second electronic device or a third electronic device.

8. The wireless communication circuit of claim 7, wherein the first electronic device uses only one specific channel to communicate with the second electronic device, and when the wireless communication circuit enters the power saving mode, only retaining the parameters of the specific channel, and the removing the parameters of the other channels from the first storage device.

9. The wireless communication circuit of claim 7, wherein when the wireless communication circuit enters the normal mode from the power saving mode, the control circuit controls the wireless communication circuit to directly use the parameters of the at least one specific channel to communicate with the second electronic device.

10. The wireless communication circuit of claim 7, wherein the control circuit moves at least a portion of the parameters of the other channels into a second storage device.

11. The wireless communication circuit of claim 10, wherein the first storage device is a volatile memory, and the second storage device is a non-volatile memory.

12. The wireless communication circuit of claim 7, wherein the plurality of channels are W-Fi channels, and the parameters of each channel are RF parameters.

* * * * *